(12) United States Patent
Jain et al.

(10) Patent No.: US 6,174,498 B1
(45) Date of Patent: Jan. 16, 2001

(54) ODOR CONTROL SYSTEM

(75) Inventors: Roop C. Jain, San Diego; Martin Scanlan, La Jolla, both of CA (US)

(73) Assignee: US Filter/RJ Environmental, Inc., San Diego, CA (US)

( * ) Notice: Under 35 U.S.C. 154(b), the term of this patent shall be extended for 0 days.

(21) Appl. No.: 08/827,848

(22) Filed: Apr. 11, 1997

Related U.S. Application Data

(62) Continuation of application No. 08/427,128, filed on Apr. 24, 1995, now abandoned, which is a continuation-in-part of application No. 08/232,203, filed as application No. PCT/US92/09248 on Oct. 27, 1992, now Pat. No. 5,518,696, which is a continuation of application No. 07/783,178, filed on Oct. 28, 1991, now abandoned.

(51) Int. Cl.[7] .................................................. B01D 50/00
(52) U.S. Cl. ......................... 422/122; 422/123; 422/171; 422/173; 95/187; 95/211; 95/235; 55/233; 55/249; 261/44; 261/DIG. 72
(58) Field of Search ............................. 422/12, 13, 122, 422/123, 171, 173; 95/187, 211, 235; 55/233, 249; 261/44, DIG. 72; 423/243

(56) References Cited

U.S. PATENT DOCUMENTS

| | | | |
|---|---|---|---|
| 2,878,107 | 3/1959 | Ruth | 422/120 |
| 3,596,439 | 8/1971 | Moragne | 55/233 |
| 3,739,551 | 6/1973 | Eckert | 55/90 |
| 3,785,127 | 1/1974 | Mare | 55/233 |
| 3,818,683 | 6/1974 | Hirsch | 55/223 |
| 3,969,479 | 7/1976 | Lonnes et al. | 423/210 |
| 3,969,482 | 7/1976 | Teller | 423/235 |
| 3,989,464 | 11/1976 | Dahlstrom | 23/260 |
| 4,022,593 | 5/1977 | Lerner | 55/90 |
| 4,225,506 | 9/1980 | de Vries | 423/210 |
| 4,269,812 | 5/1981 | Edwards et al. | 423/242 |
| 4,307,067 | 12/1981 | Tagawa et al. | 423/224 |
| 4,419,331 | 12/1983 | Montalvo | 422/170 |
| 4,421,534 | 12/1983 | Walker | 55/73 |
| 4,437,867 | 3/1984 | Lerner | 55/233 |
| 4,609,386 | 9/1986 | Sibley et al. | 55/223 |
| 4,948,402 | 8/1990 | Davis | 55/233 |
| 5,160,707 | 11/1992 | Murray et al. | 422/170 |
| 5,330,725 | 7/1994 | Mumalo | 422/170 |

*Primary Examiner*—Nina Bhat
(74) *Attorney, Agent, or Firm*—William Patrick Waters

(57) ABSTRACT

An odor control system and method for removing unwanted odorous airborne constituents in which the gas stream is flowed through a compact, boxlike housing having a plurality of sequentially communicating treatment chambers. Gas stream pretreatment is accomplished in a first chamber, in fluid communication with a sump, as the gas flows through a packed bed wetted by suitable chemical reagents. After pretreatment, the gas stream is passed through downstream chambers, also utilizing wetted packed beds. These chambers are in fluid communication with a second, separate sump. Because of the first chamber/separate sump combination, influent gas treatment, by stages, can be accomplished. In this manner, different, contemporaneous chemical treatments are possible, within the single housing, with different chemical reagents utilized as needed. Such treatments are possible even in cases where otherwise incompatible chemical reagents are used. Reagents used in the first chamber are, in substantial part, recycled from the blowdown of the first chamber sump which can be augmented, if desired, by unreacted chemicals in the blowdown of the downstream sump. After treatment in the last downstream chamber, the cleaned gas flows through a demister, for moisture removal, before it is exhausted to atmosphere.

30 Claims, 3 Drawing Sheets

ODOR CONTROL SYSTEM

RELATED APPLICATIONS

This application is a continuation of application Ser. No. 08/427,128, filed Apr. 24, 1995, abandoned which is a continuation-in-part patent application of U.S. patent application Ser. No. 08/232,203, filed Apr. 4, 1994 now U.S. Pat. No. 5,518,696, which is a 35 U.S.C. Section 371 of PCT/US92/09248, filed Oct. 27, 1992, as a continuation patent application of U.S. patent application Ser. No. 07/783,178, filed Oct. 28, 1991, now abandoned.

TECHNICAL FIELD

The present invention relates in general to control systems and methods of using them for removing unwanted constituents from fluid streams. More particularly, the present invention relates to an odor control system which operates in a more effective and efficient manner in removing unwanted odorous constituents from waste gas streams.

BACKGROUND ART

The increasing concentration of population in urban settings over the past several decades has presented important environmental problems. Prominent among such problems is one presented when it becomes desirable, from a public health or aesthetic consideration, to remove unwanted odorous constituents from a gas stream, prior to its release into the atmosphere.

Various techniques have been developed in response to the need for odorous constituent removal. As a general rule, an effective technique should be tailored to the particular constituent to be removed.

For example, in the case of odors carried by air which has been in contact with untreated sewage in pumping stations, several considerations are in order. To assess each properly, it is important to identify and characterize the odor causing constituent before attempting to develop techniques for its removal. Thus, in the sewage system environment, a primary cause of odor is hydrogen sulfide. This compound is detectable by the human olfactory sense at very low concentrations. In addition to the unpleasant odor associated with it, hydrogen sulfide is noted for its toxicity and its capacity for corroding materials with which it comes in contact.

Of course, hydrogen sulfide is not the only undesirable constituent found in effluent gases. Others, such as amines, mercaptons and organic acids can be produced from a variety of sources, including rendering plants, kraft pulp plants, paint and coating operations and oil refineries. Because of the undesirability of introducing such undesirable constituents into the atmosphere, communities and governmental agencies have formulated criteria for their regulation. A suitable odor control system, meeting such criteria, would substantially reduce the likelihood of any public nuisance or annoyance by removing, in a cost effective manner, substantial amounts of unwanted substances, preferably at or near the source of their production.

Removal of odorous constituents from a waste gas stream can be accomplished by several techniques. In general, conventional odor control systems can be divided into five major classes as follows:

A. Incineration. In this technique, thermal oxidation occurs when the temperature of the gas stream is elevated to a level at which compounds burn in the presence of oxygen derived from the atmosphere or from the stream containing the odorous constituents. High temperatures are required. Although this technique is effective in controlling odor to almost any desirable level, fuel costs are generally high, even when heat recovery methods are employed.

Thus, although incineration is suitable for some applications, it is not generally the technique of choice in many odor control applications.

B. Adsorption. This comprises a process in which gaseous constituents are trapped and oxidized on the surface of a solid. Commonly used sorbents are activated charcoal and carbon. In general, systems utilizing adsorption are easy to operate and sometimes desirable because no liquid waste is produced. However, because frequent regeneration of the sorbent is required, adsorptive systems are not generally desirable as a primary odor control system.

C. Dilution. In this technique, odorous gas is mixed with enough fresh air to reduce odor concentration below a threshold level. Such a technique is not acceptable, at least in some applications, because unacceptably large volumes of fresh air would be required to achieve a desired level of odor control.

D. Masking. Odor modification or masking is a method in which a pleasant odor is superimposed on an unpleasant one. The technique is based on the premise that a person perceives a mixture of smells as a single odor. Masking is impractical for odor control at stations where large volumes of odor contaminated air are being discharged.

E. Absorption. Absorption, or chemical oxidation, is a process in which odorous compounds in a gas stream are transferred into a liquid solution and are chemically oxidized in the liquid phase. In general, a liquid solution of chemical reagents is used.

In some cases, the absorption method, utilizing chemical reaction and oxidation, is the technique of choice because of cost considerations, especially when large gas volumes having relatively low concentrations of odorous compounds are involved. In general, the technique is utilized in a mass transfer system conventionally known as a scrubber.

In scrubber systems utilizing the absorption method, reaction between chemical treating agents and the odorous constituents takes place in the liquid phase. Removal efficiency depends on the transfer rate of the compounds from air into liquid. This, in turn, is dependent on mass transfer coefficient and total interfacial surface area. Such considerations drive scrubber design.

Several conventional scrubber systems exist for bringing chemical reagents into contact with an air stream bearing odorous compounds. Such systems include packed towers, spray/mist chambers, Venturis and impingement tray towers.

A conventional chemical treatment and oxidation scrubber currently in widespread use is a scrubber utilizing a packed tower with a fan for exhausting odors from a contaminated area. Often, such a scrubber comprises a large cylindrical tower having random packing irrigated by a recirculating reagent solution from a liquid sump located below the packing. The random packing, as opposed to structured packing, is used to maximize surface contact between the gas undergoing treatment and the reactant liquid. In such a system, odorous gas is passed through the unit and contacted with the recirculating liquid stream in a counter-current fashion. Odorous constituents are absorbed into the liquid where they react with chemicals added to the recirculating liquid. The treated gas exits at the top of the scrubber and by-product reactants are accumulated in the liquid in the sump until purged from the system by a blowdown stream.

In some cases, scrubbers utilizing packed towers are added as a retro-fit project in response to neighbor or employee complaints. In other cases, of course, such systems are contemplated in the initial design of a facility and are erected during facility construction. In either case, a typical packed tower system presents significant height and floor space requirements. In other words, such systems often have a "footprint" which is substantially greater than one might wish.

For example, a typical 15,000 cfm packed tower system for a municipal wastewater treatment plant requires more than 20 feet of height clearance and, with ancillary equipment, occupies approximately 400 square feet of floor space. Thus, it is apparent that such conventional systems, although having substantial utility, impose a large sacrifice of expensive facility space and volume. The problem is compounded when a plurality of packed towers is required, either because of the nature of the unwanted substances in the gas being treated or because reaction products formed within one packed tower must, in turn, be treated or neutralized in another tower before release to atmosphere.

In view of the aforementioned limitations of conventional odor control systems, it would be desirable to have a system for effective treatment of odorous gases which would eliminate the necessity of dedicating large portions of a facility to the system.

In addition to the expensive and undesirable space penalties presented by conventional systems, other problems are presented by the necessity of purchasing and installing ancillary equipment. Typical scrubbers utilize one or more packed towers, each of which requires, for its operation, recirculating pumps, exhaust fans, chemical metering pumps, liquid monitors and chemical storage. These components are generally assembled at the site of erection of the scrubbing system and must by wired or plumbed into the system. In the usual case, they substantially increase the size of the footprint of the scrubber and their cost can sometimes equal or exceed the capital cost of the equipment, especially when installation costs are considered.

In cold climates, it is sometimes necessary to insulate or provide suitable enclosures for the ancillary equipment, thereby again increasing installation and operating costs. In view of these considerations, it would be very desirable to have an odor control system which would reduce substantially the costs of installing and operating ancillary equipment. Ideally, such a system would have operating efficiencies at least equal to those of conventional systems while substantially reducing installation costs and the size of the system footprint.

Another significant problem with conventional packed towers is plugging of the packing as a result of accumulation of solids. Such accumulations can quickly lead to reduced system efficiency. Plugging may be caused by a variety of operational parameters such as hardness of make-up water, the chemical reagents utilized, and system pH. It is generally recognized that plugging can be effectively reduced or eliminated by purging the system. In the purging process, an amount of the recirculation stream, together with an equal or greater amount of the by-product salts created and added to the system, must be constantly removed from the sump to prevent the accumulation of solids and resultant plugging. Fresh make-up water and new chemical reagent must be added to replace the purge stream.

However, a major concern in consideration of system purge rate is the cost of unreacted chemical reagent which is sent to the drain during the purging process. Over time, this cost can make system operation prohibitively expensive. The alternative, an inefficient, plugged system, is also unacceptable. The dichotomy presented by the desire to have a smoothly operating system on the one hand and conserving chemical reagent on the other hand, can cause friction among system managers where one may desire high purge rates (and reduced maintenance costs) while another would opt for reducing chemical reagent costs by utilizing low purge rates.

In view of the foregoing, it would indeed be desirable to have an odor control system in which packed tower purging could be accomplished with a significant reduction in reagent waste. Such a system would result in a significant reduction in the large footprint of conventional systems, would reduce or eliminate some of the problems presented by installation and operation of ancillary equipment, and would provide a method of packed tower purging that would permit suitable purge rates while reducing the amount of wasted reagent. Such a desirable odor control system would substantially lower operating costs by maximizing reagent utilization.

DISCLOSURE OF THE INVENTION

The principal object of the present invention is to provide a new and improved odor control system, and method of using it, for removing unwanted substances from waste gases while optimizing chemical utilization.

It is another object of the present invention to provide a new and improved odor control system which, compared to such conventional systems, operates at substantially reduced costs.

Another object of the present invention is to provide an odor control system which is relatively inexpensive to manufacture and easily installed, requiring little maintenance.

It is a further object of the present invention to provide a new and improved odor control system in which the gas treating components are located in a single housing.

It is a still further object of the present invention to provide a new and improved odor control system in a compact arrangement of components to conserve the facility area required for its installation.

It is still another object of the present invention to provide a new and improved odor control system having the capability of multiple stages and multiple chemistries in a single housing. In this regard, conventional chemicals, such as sodium hydroxide, sodium hypochlorite, hydrogen peroxide and sulfuric acid, can be efficiently utilized. Moreover, because of the novel design of the present invention, otherwise incompatible chemicals, requiring dramatically different pH conditions to function, can be utilized contemporaneously in a once through process. Thus, for example, sulfuric acid and sodium hydroxide may be used at the same time for a particular scrubber operation.

It is an even still further object of the present invention to provide a new and improved odor control system which can be factory assembled and tested, prior to delivery to the job site.

It is still another object of the present invention to provide an odor control system having a lower height and substantially smaller footprint than conventional odor control systems.

Briefly, the above and further objects of the present invention are realized by providing an odor control system and method for removing unwanted odorous airborne constituents in which the gas stream is flowed through a compact, boxlike housing having a plurality of sequentially communicating treatment chambers. Gas stream pretreatment is accomplished in a first chamber, in fluid communication with a sump, as the gas flows through a packed bed wetted by suitable chemical reagents. After pretreatment, the gas stream is passed through downstream chambers, also utilizing wetted packed beds. These chambers are in fluid communication with a second, separate sump. Because of the first chamber/separate sump combination, influent gas treatment, by stages, can be accomplished. In this manner, different, contemporaneous chemical treatments are possible, within the single housing, with different chemical reagents utilized as needed. Such treatments are possible even in cases where otherwise incompatible chemical reagents are used. Reagents used in the first chamber are, in substantial part, recycled from the first chamber sump. These reagents are augmented by unreacted chemicals from the blowdown of the downstream sump. After treatment in the last downstream chamber, the cleaned gas flows through a demister, for moisture removal, before it is exhausted to atmosphere.

The odor control system of the present invention provides several distinct advantages. First, the boxlike geometry permits mounting of metering and recirculating pumps, oxidation reduction potential controls and pH controls on the system itself. Secondly, the boxlike construction permits use of vertical seal less pumps instead of the horizontal, centrifugal pumps used in conventional systems. As a result of this improvement, suction piping, mechanical seals and water for the seals are eliminated and space requirements for pumps are significantly reduced as are costs related to mechanical seal replacement. Further, the smaller footprint of the present invention affords a lower system height while permitting multiple stages and multiple chemistries. In addition, the construction of the present invention allows 25% to 50% more throughput of contaminated air, as compared to conventional odor control systems.

Still further advantages of the present invention relate to a novel use of a purge stream prior to discharge of the stream into the drain, thereby increasing chemical utilization. As a result of this feature, maintenance costs are reduced since higher purge rates can be used in view of increased chemical utilization. Also, the use of low cost chemicals, such as caustic, in the pretreatment stage, in combination with the use of the purge stream, further reduces operating costs. In addition, the present invention is so flexible that it permits, in the same apparatus, use of low energy packing to remove easily removable substances (such as ammonia) and high performance (high energy) packing for removal of more difficult substances (such as mercaptans).

In view of the foregoing, it can be seen that the present invention significantly reduces chemical cost, during the lifetime of the system, by recovering unreacted chemical and recycling it through the gas pretreatment stage. In this regard, significant annual savings can be realized when compared to operating costs of conventional odor control systems.

Another advantage of the present invention is that it utilizes rectangular geometry in which system components are fit into a very compact boxlike structure, thereby requiring significantly less facility area. Another advantageous aspect of the system design is seen in the fact that a significant reduction in system plumbing and ducting can be accomplished, thereby reducing installation costs and substantially eliminating problems of leakage.

Still another advantage of the present invention is that, by virtue of its unitary construction, the odor control system can be factory assembled, piped, wired and tested, thereby eliminating the expense and inconvenience of field assembly and thereby reducing installation costs and providing a more easily maintained and more aesthetically pleasing system.

Yet still another advantage of the present invention is that it has increased flexibility and reduced operating costs, as compared to conventional odor control systems, by virtue of having multiple stages within a single housing.

Yet still another advantage of the present invention is that it is capable of multiple chemistries, thereby increasing system flexibility and reducing operating costs.

In summary, the odor control system of the present invention is a 3-stage, single-pass system capable of automatic operation with automatic chemical injection, but also capable of manual operation. The system comprises a complete package of unitary construction, preassembled, piped, wired, and factory tested and including a scrubber, demister, fan, metering and recirculation pumps and controls. The customer needs only to provide foul air ducting, concrete pad, electrical power, properly softened water supply, drain and chemical storage tanks.

BRIEF DESCRIPTION OF THE DRAWINGS

The above mentioned and other objects and features of this invention and the manner of attaining them will be become apparent, and the invention itself will be best understood, by reference to the following description of the embodiment of the invention in conjunction with the accompanying drawings, wherein.

BEST MODE FOR CARRYING OUT THE INVENTION

Figure 1:
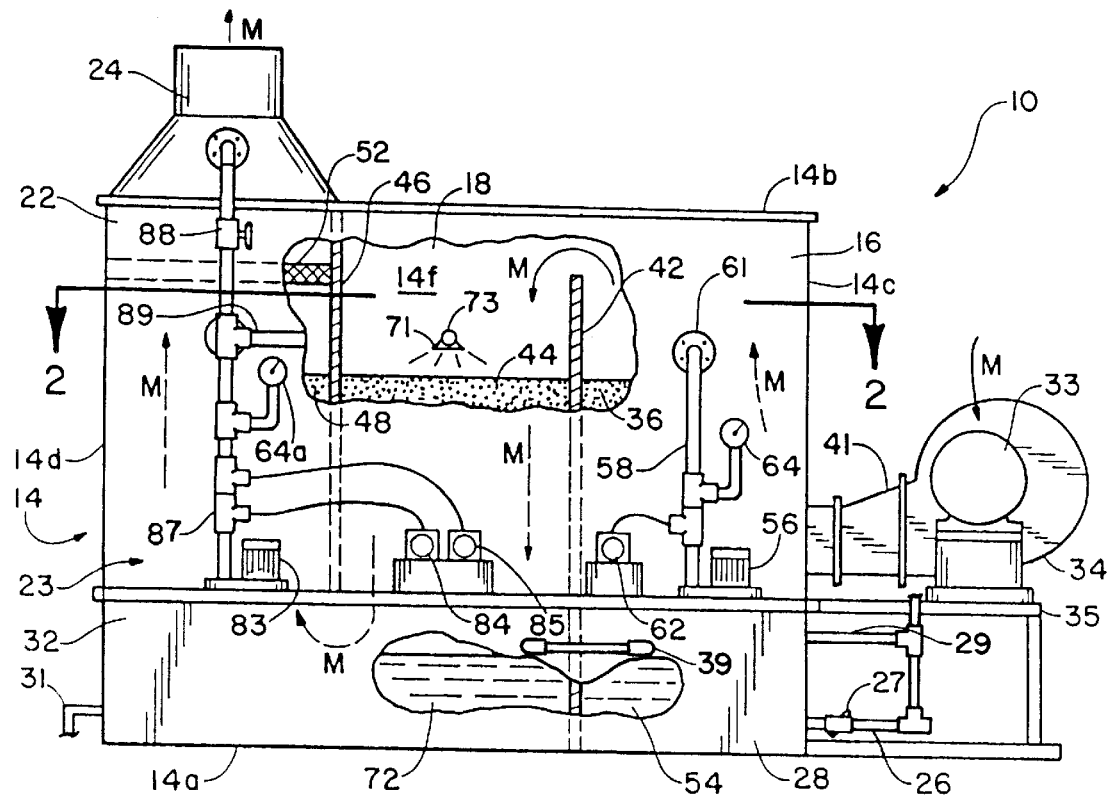
FIG. 1 is a diagrammatic view of an odor control system which is constructed according to the present invention.

Referring now to the drawings and, more particularly to FIG. 1 thereof, there is shown a new odor control system 10 which is constructed in accordance with the present invention. The system 10 receives waste gases, bearing unwanted odorous constituents, from such sources as semiconductor process plants, kraft pulp plants, paint and coating operations, oil refineries and municipal wastewater treatment plants. The gas stream may carry hydrogen sulfide, acidic gases or other substances either hazardous to human health or unacceptable to people in the vicinity of the gas producing source.

In copending patent application Ser. No. 08/232,203, there is disclosed a novel emergency scrubbing system which has utility in removing explosively released gases, such as chlorine gas, from a gas stream. This emergency scrubber is boxlike in design having three sequentially connected treatment chambers disposed over a common sump. Chemical reagents sprayed into the chlorine gas react therewith and reaction products, together with unreacted chemical reagents, fall into a common sump. During operation of the emergency scrubbing system, the gas flowing therethrough reverses direction several times thereby increasing the dwell time in the system and helping to produce excellent system performance.

In the system 10 of the present invention, a boxlike housing 14 is also utilized. It contains three sequentially connected treatment chambers and, as the gas stream flows through the system 10, it changes direction three times. In typical system 10 operation, a pretreatment stage occurs in an inlet chamber 16 where the gas stream passes through a packed bed 36 which has been wetted with chemical reagents.

After pretreatment in the inlet chamber 16 is accomplished, the gas stream flows through another packed bed 44 in an intermediate chamber 18, thence through yet another packed bed 48 located in an outlet chamber 22. A second sump 32, separated from the sump 28, but in fluid communication therewith, is located beneath the chambers 18 and 22. Once again, a surplusage of reagents can be utilized to wet the packed beds 44 and 48 since the unreacted portion thereof are collected in the sump 32. These reagents are transferred to the sump 28 for recirculation through the packed bed 36. In this novel manner, waste of unreacted chemical is significantly reduced and, in some cases, it is virtually eliminated. As a result, substantial cost savings are realized in comparison to conventional single step odor control systems.

Figure 2:
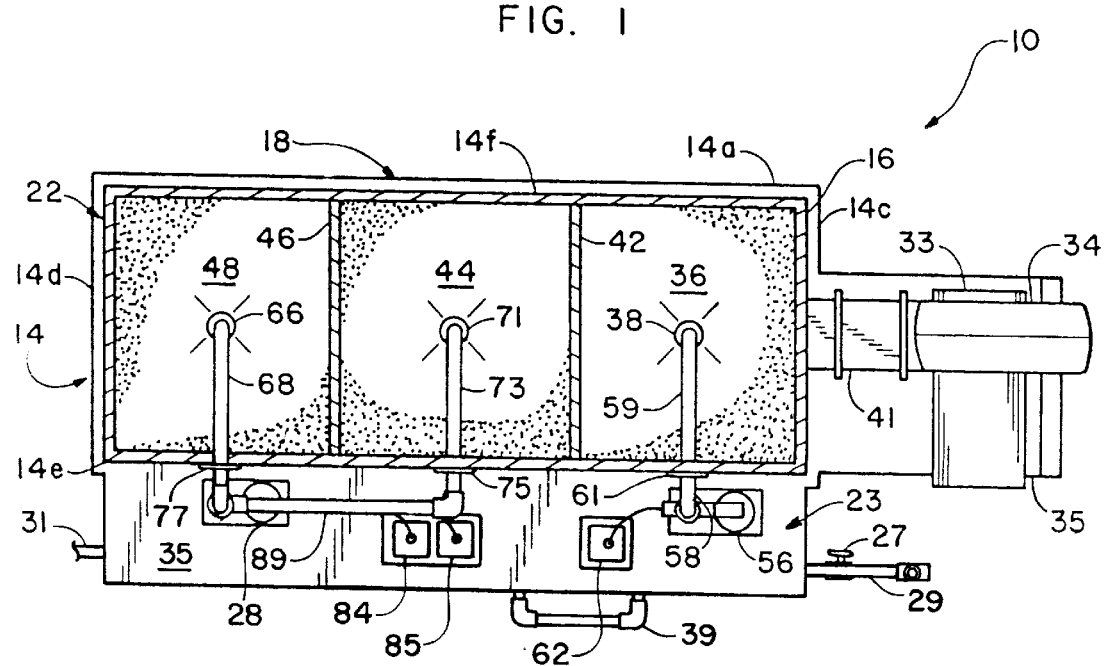
FIG. 2 is a view of the odor control system of FIG. 1, taken along line 2—2 of said figure.

With reference to FIGS. 1 and 2, the housing 14 of the system 10 includes a bottom wall 14a, a top wall 14b, side walls 14c and 14d, a front wall 14e and a back wall 14f. An interior wall 42 separates the inlet chamber 16 from an intermediate chamber 18 while another interior wall 46 separates the intermediate chamber 18 and the outlet chamber 22. It will be noted that the wall 42, while it does not extend to the top wall 14b, does extend between the inlet chamber 16 and the intermediate chamber 18 to contact the bottom wall 14a, thereby defining, together with portions of the side wall 14c, back wall 14f and front wall 14e, the sump 28. In like manner, the interior wall 46, together with the side wall 14d, back wall 14f, front wall 14e and bottom wall 14a, defines a second sump 32.

After the gas stream has been pretreated, it flows into the intermediate chamber 18 where, once again it is flowed through a wetted packed bed 44 before it flows out of the intermediate chamber 18 and into the outlet chamber 22. The third packed bed 48, similarly wetted with suitable chemical reagents is utilized in the outlet chamber 22. As noted beneath the intermediate chamber 18 and the outlet chamber 22 is the common sump 32 which is separated from the sump 28 by the wall 42. Here again, a surplusage of chemical reagents can be used since unreacted reagents fall into the sump 32 where, by virtue of an overflow conduit 39 the unreacted reagents in the sump 32 can be flowed into the sump 28 for recirculation through the packed bed 36. Liquid flow through the overflow conduit 39 can be controlled by an amount of make up water to the sump 32. As desired, liquids may be drained from the sump 28 through a drain 26, controlled by a valve 27. A sump overflow pipe 29, in fluid communication with the drain 26, can be used to maintain a suitable liquid level in the sump 28. A drain 31 can be utilized for draining the sump 32.

Considering now FIGS. 1 and 2 in greater detail, a waste gas stream flowing under pressure in a manner designated generally by the arrows M, enters the system 10 at an inlet 33 of a fan 34. The fan 34 rests on a shelf 35 which is supported in a conventional manner. The fan 34, connected in fluid communication with the inlet chamber 16 by a duct 41, drives the gas stream along the course M through the system 10.

Pretreatment of the gas stream occurs in the inlet chamber 16. The packed bed 36, used to maximize surface contact between odorous gas constituents and reactant liquids, is wetted by chemical reagents delivered through a nozzle 38 (FIG. 2). The nozzle 38 is preferably made of Teflon, polypropylene or PVC having a full cone, wide angle non-clog construction. It is fluidly connected to a riser 58 by a header 59.

The packing media utilized for packing of the bed 36, whether the bed is structured or random, is typically polypropylene or PVC which are generally resistant to the corrosive attack of acids, alkali and bleach solutions. Different packing media can be utilized in the odor control system of the present invention to optimize removal of different gas stream components. For example, ammonia is very easily neutralized with acid. Thus, a low energy (low pressure drop) packing can be used while other components, such as mercaptans, require very high energy packing media for effective removal.

During system 10 operation, the gas stream, after passing countercurrently through the packed bed 36, flows over the wall 42. After the pretreatment stage in the inlet chamber 16 is completed, the gas stream, following the arrow M, exits the inlet chamber 16 by flowing over the wall 42 whereupon it enters the intermediate chamber 18 for further chemical treatment. The packed bed 44 in the intermediate chamber 18 and the packed bed 48 in the outlet chamber 22 are similar in function and construction to the packed bed 36 and each also contains suitable packing. The packed bed 48 is wetted through a nozzle 66 which, in turn, is fed by a header 68 while the packed bed 44 is wetted by a nozzle 71 receiving solution through a header 73. The headers 68 and 73 connect to flanges 77 and 75 respectively, each being mounted on the front wall 14e in a manner similar to the flange 61.

In the intermediate chamber 18, the packed bed 44, having packing media wetted by suitable chemical reagents, is utilized for further treatment, in a cocurrent manner. After passing through the packed bed 44, the gas stream M flows downwardly and under the wall 46.

In the outlet chamber 22, the gas stream M flows upwardly through the packed bed 48, then through a mist eliminator 52 from whence it is discharged through a stack 24 to atmosphere. The mist eliminator 52 is generally constructed of polypropylene, PVC, thermoplastic, or fiberglass. It is capable of removing virtually all droplets greater than 40 microns in diameter.

During gas stream M cleaning, the sump 28 contains an aqueous solution 54 of suitable chemical reagents, including chemical reagents from the sump 32. This solution 54 is pumped, by a recirculating pump 56 through the riser 58 for delivery to the packed bed 36. The recirculation pump 56 is a seal-less, vertical, centrifugal type pump of CPVC or FRP construction for corrosion resistance and long service life. The pump is suitable for solutions over a broad pH range. It is mounted for easy service on the shelf 35 in a conventional manner. An overflow drain 65 is utilized for removal of reaction products from the sump 28.

In the intermediate chamber 18, the gas flows cocurrently through the packed bed 44. As the gas flows through the packed bed 48, chemical reactions, based on mass transport principles occur and reactions products, unreacted chemicals and water flow downwardly into the sump 32 which is located beneath the intermediate chamber 18 and the outlet chamber 22.

A metering pump 62, also mounted on the shelf 35, may be utilized to introduce fresh chemical in addition to blowdown of unreacted chemical from the sump 32 flowing through the riser 58. Riser pressure is displayed on the gauge 64. The riser 58 is connected to the flange 61 at the outer wall 14e at a height above the location of the packed bed 36. The header 59 is reversibly connected to the riser 58 at the flange 61.

With regard now to gas stream treatment, in the intermediate chamber 18 and in the outlet chamber 22, a recirculating pump 83, similar in function and construction to the pump 56 is mounted on the shelf 35 to pump solution through the riser 87. A pair of metering pumps 84 and 85 identical in construction and function to the pump 62, is disposed on the self 35. The pumps 84 and 85 are utilized to control the amount of fresh reagent added to the aqueous solution 72 flowing through the riser 87. Riser pressure is displayed on a gauge 64a.

The partition wall 46 separates the intermediate chamber 18 from the outlet chamber 22. The wall 46 does not extend into the sump 32, which contains an aqueous solution 72, so that the gas stream is permitted to flow under the partition 46 and thence upwardly through the outlet chamber 22.

The gas undergoing treatment in the outlet chamber 22 is treated in a countercurrent manner and, upon exiting the packed bed 48, it flows through the mist eliminator 52 and as cleaned gas, is exhausted to atmosphere. It will be noted by reference to FIG. 1, that the riser 87, controlled by a valve 88, is capable of carrying reagents and aqueous solution of chemicals to a place above the mist eliminator 52. In this manner, the mist eliminator can be washed with suitable solutions as deemed necessary.

Considering now a chemical feed and dilution subsystem 23 in greater detail with reference to FIGS. 1 and 2, the subsystem is comprised of recirculating pumps, metering pumps and liquid distribution risers and nozzles. The subsystem 23 permits delivery of reagents such as sodium hydroxide and/or sodium hypochlorite to the spray nozzles 38, 71 and 66 where the chemical solution is circulated through the packed beds 36, 44, and 48 respectively.

The metering pumps 62, 84 and 85 are positive displacement, diaphragm type chemical metering pumps which, in normal operation, typically deliver 50% sodium hydroxide and/or 12.5% sodium hypochlorite solution to the packed beds.

Figure 3:
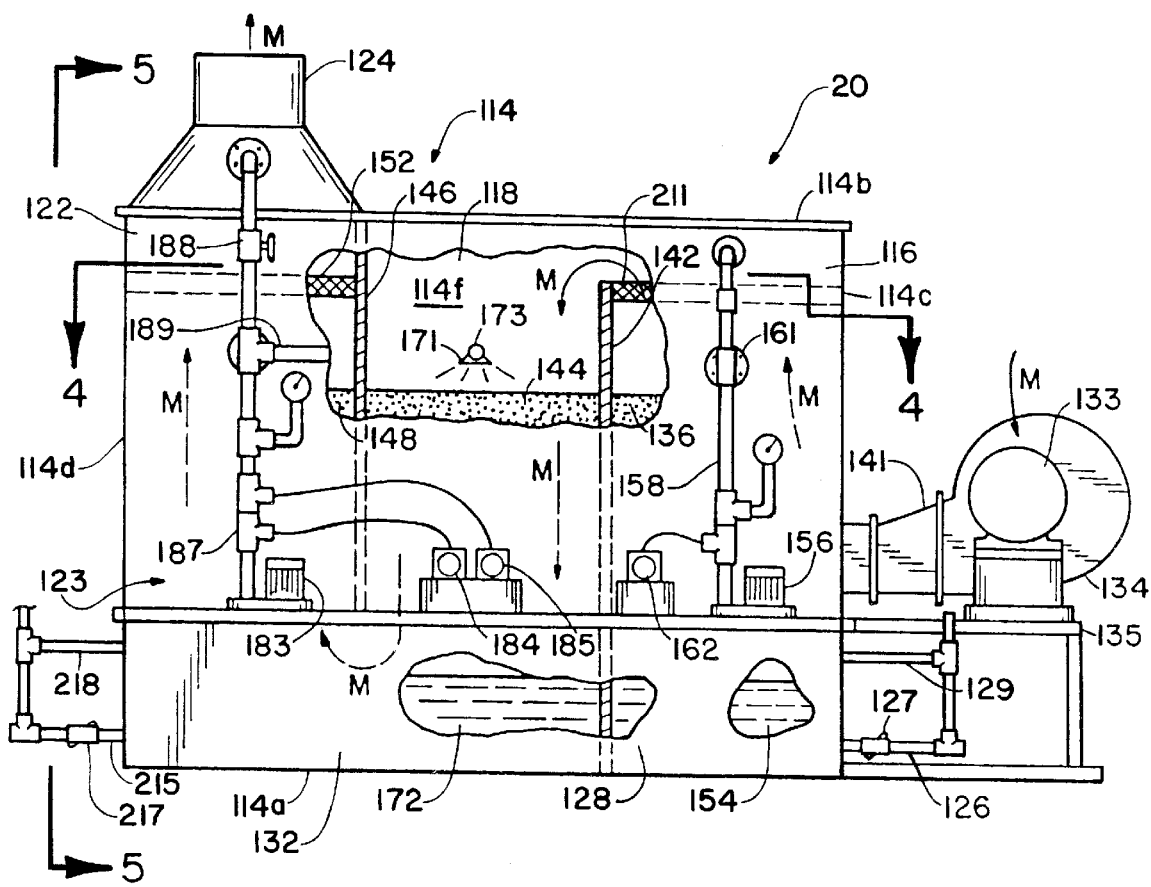
FIG. 3 is a diagrammatic view of another embodiment of an odor control system constructed according to the present invention.
Figure 4:
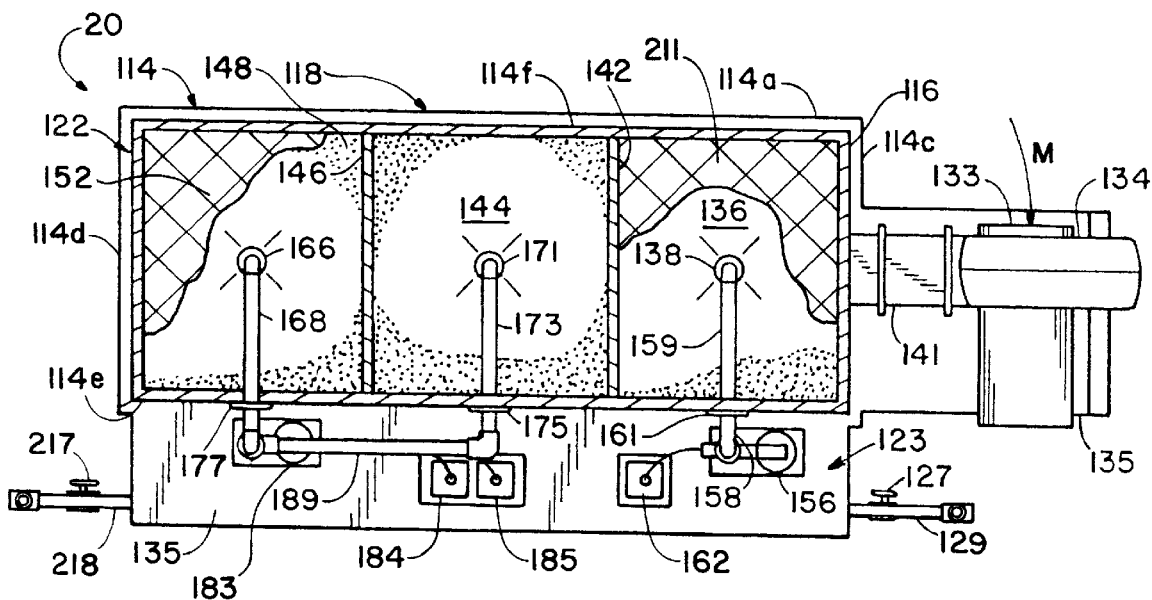
FIG. 4 is a view of the odor control system of FIG. 3, taken along line 4—4 showing portions cut away.
Figure 5:
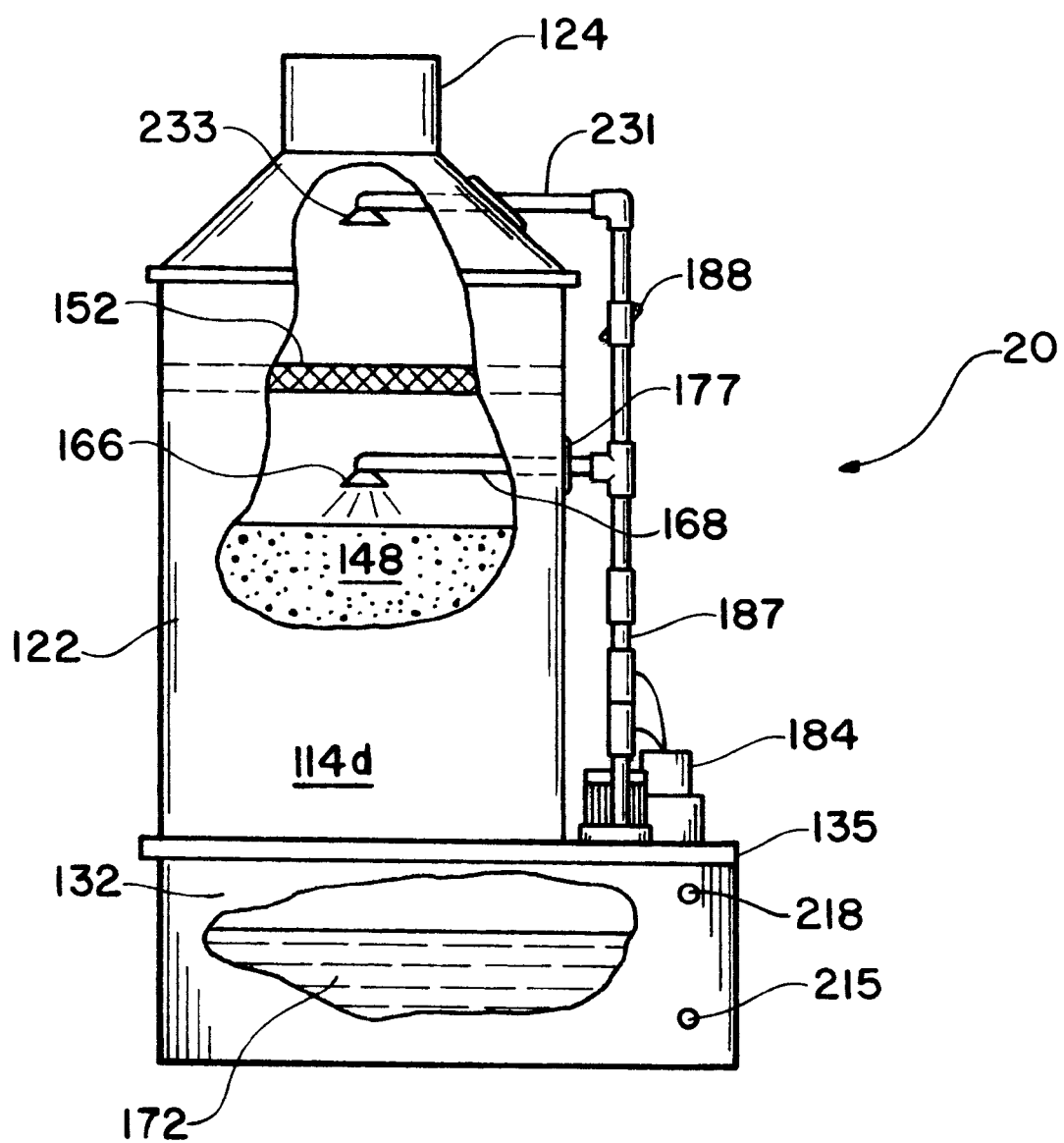
FIG. 5 is a view of the odor control system of FIG. 3, taken along line 5—5 of said figure.

Referring now to FIGS. 3–5, there is shown an odor control system 20 which is another embodiment of the present invention. Many of the components of the system 20 are identical in construction, location and function to their respective counterparts in the system 10, as depicted in FIGS. 1 and 2.

Thus, for convenience, such components in the odor control system 20 will use the same reference numerals as those used for their counterparts shown in FIGS. 1 and 2 but the numerals will be preceded by "1". Thus, for example, the inlet chamber 116 of FIGS. 3–5 is identical to the inlet chamber 16 of FIG. 1. Further, the discussion of the structure, location and function of such counterparts will not be repeated but is incorporated herein by reference as though fully set forth.

Referring now to FIGS. 3–5, it will be noted that a mist eliminator 211 is located adjacent of the inlet chamber 116. The mist eliminator 211 provides great flexibility with regard to selection of chemical reagents for use in the system 20. For example, the mist eliminator can prevent acid carryover from the inlet chamber 116 into the downstream chambers. Thus, gas steam treatment with sulfuric acid under highly acidic conditions can be accomplished in the inlet chamber 116 while alkaline reagents are being utilized in the downstream chambers. In this manner, a highly efficient and effective gas stream treatment can be realized in a once through process.

In the system 20, the sump 132 has a drain 215 controlled by a valve 217. An overflow pipe 218 fluidly connects the sump 132 with the drain 215.

With reference now to FIG. 5, the riser 187 communicates with a header 231 for delivery of liquid to a nozzle 233 for spraying the mist eliminator 152 with a cleaning substance, if desired. Liquid flow to the nozzle is controlled by a valve 234.

Some of the above mentioned novel capabilities of the separate sump/separate chambers of the odor control systems 10 and 20 may be illustrated by the following Examples.

EXAMPLE I

When it is desirable to remove hydrogen sulfide from a gas stream, sodium hydroxide, (caustic) and sodium hypochlorite (bleach) can be applied to the packed beds of the intermediate and outlet chambers. Unreacted bleach and caustic, collected in the downstream sump 32 can be recirculated through the packed bed 36 in the inlet chamber 16. Thus an effective scrubbing operation is realized while chemical usage is reduced.

EXAMPLE II

Conventional scrubbers utilize sodium hydroxide for hydrogen sulfide removal and generally function at about 80% efficiency. Sodium hydroxide is the reagent of choice, in such scrubbers, because it costs less than 10% of the cost of sodium hypoclorite. By utilizing the odor control systems 10 and 20 of the present invention, sodium hydroxide is applied to the packed bed 36, in the inlet chamber 16, thereby removing 80% of the hydrogen sulfide at about 10% of the cost of using bleach. Subsequently, the remaining hydrogen sulfide is removed, in the intermediate chamber 18 and in the outlet chamber 22, as sodium hypochlorite and sodium hydroxide are applied to the packed beds 44 and 48, respectively. Thus again, an effective operation is achieved with significant economies in chemical usage, especially in the case of the more expensive sodium hypochlorite.

EXAMPLE III

In a case when it is desirable to remove ammonia or amines from a gas stream, a chemical reagent of choice is often sulfuric acid which reacts optimally at low pH. This presents problems for conventional odor control systems since the caustic substances and bleaches, useful for removal of reduced sulfides, can only function at elevated pH.

By utilizing the odor control system 20 of the present invention, the problems seen in conventional systems are solved. In this case, the sumps 128 and 132 are kept separate. Sulfuric acid is used to wet the packed bed 136. In this manner, the pH within the inlet chamber 116 is substantially lowered and salts such as ammonium sulfate are by-product reactants. These reactants are removed continually through the overflow 129 (FIG. 3).

Sulfuric acid carryover from the inlet chamber 116 is prevented by the mist eliminator 211. The gas stream M flows from the mist eliminator and through the downstream chambers where caustic and bleach can be applied. Thus, while unreacted chemicals can still be recirculated, there is no carryover from the sump 128 to the packed bed 144. In this manner, chemical treatments at a strongly acid pH and at a highly alkaline pH can be accomplished, in a novel manner, within the single housing 114.

While preferred embodiments of the invention have been shown and described, it will be apparent to those skilled in this art that various modification may be made in these embodiments without departing from the spirit of the present invention. For that reason, the scope of the invention is set forth in the following claims.

What is claimed is:

1. A system for removing unwanted constituents from a gas stream, comprising:

an unitary housing, said housing having, at an upstream end thereof, an inlet for receiving a gas stream carrying unwanted constituents, and having, at a downstream end thereof, an outlet for the exhaustion to atmosphere of a gas stream which has been cleaned while passing through said housing, said housing further having a wall disposed inside thereof between said upstream end and said downstream end, said wall forming first and second chambers, between said upstream end and said downstream end respectively, said wall having a height less than the height of said formed chambers, said chambers being in series fluid communication for confining a gas stream for pretreatment in said first chamber and subsequent treatment in said second chamber and for passing the gas stream from the inlet of said upstream end toward said downstream end and out the outlet thereof, wherein said gas stream flows over said wall, and directly into said second chamber, thereby changing direction of gas flow whereby said direction of flow in one of said chambers is opposite to the direction of flow in the other one of said chambers, said housing further having first and second sumps forming a bottom of said housing and being in fluid communication with said first and second chambers, respectively, each of said first and second sumps containing an aqueous reagent solution for the treatment of the gas stream flowing through said system;

means for delivering, from said first and second sumps, respectively, an aqueous reagent solution, to said first and second chambers, to thereby treat the gas stream flowing therethrough, wherein one portion of said aqueous reagent solution reacts chemically with unwanted constituents in the gas stream to produce reaction products removing unwanted constituents from the gas stream and another portion of said aqueous reagent solution remains unreacted, and wherein the reaction products and the unreacted aqueous reagent solution are collected in said first and second sumps by being returned thereto from said first and second chambers, respectively;

means located external to said housing for delivering reagent to said first and second chambers to augment the aqueous reagent solution being delivered by said delivering means; and means fluid coupling said first and second sumps for delivering unreacted aqueous reagent solution from one of said first and second sumps to the other one of said first and second sumps for combining with the unreacted aqueous reagent solution in the other one of said first and second sumps, whereby the combined unreacted aqueous reagent solution is recycled by said means for delivering to said first chamber, to thus remove unwanted constituents from the gas stream flowing through said system.

2. The system according to claim 1, wherein said means for removing includes sump means.

3. The system according to claim 1, including demister means, disposed in the outlet of said downstream end of said housing, for removing moisture from said gas stream.

4. The system according to claim 1, wherein said means for delivering an aqueous reagent solution includes atomizing nozzle means.

5. The system according to claim 1, wherein said means for delivering an aqueous reagent solution includes first nozzle means for spraying solution into the gas stream flowing through said first chamber and second nozzle means for spraying solution into the gas stream flowing through said second chamber.

6. The system according to claim 1, wherein said aqueous reagent solution includes sodium hydroxide.

7. The system according to claim 1, wherein said aqueous reagent solution includes sodium hypoclorite.

8. The system according to claim 1, wherein said aqueous reagent solution is a compound selected from the group consisting of sodium hydroxide, sodium hypoclorite, sulfuric acid and hydrogen peroxide.

9. The system according to claim 1, including fan means for flowing said gas stream, under pressure, through said housing.

10. A system for removing unwanted constituents from a gas stream, comprising:

an unitary housing, said housing having a top wall and a bottom wall, said housing further having, at an upstream end thereof, an inlet for receiving a gas stream carrying unwanted constituents, and having, at a downstream end thereof, an outlet for the exhaustion to atmosphere of a gas stream which has been cleaned while passing through said housing, said housing having a first partial wall extending upwardly from said bottom wall and a second partial wall extending downwardly from said top wall wherein said walls are disposed, juxtapositionally, inside said housing between said upstream end and said downstream end, said first and second partial walls forming three chambers, a first one of said chambers being formed by said first wall and said upstream end, a second one of said chambers being formed between said first and second walls, and a third one of said chambers being formed by said second wall and said downstream end, and said first, second and third chambers being in series fluid communication for confining a gas stream for treatment in each of said first, second and third chambers as the gas stream sequentially flows directly therethrough and for passing the gas stream from the inlet of said upstream end toward said downstream end and out the outlet thereof, wherein as said gas stream flows through said chambers the direction of gas flow changes whereby said direction of flow in one of said chambers is opposite to the direction of flow in an adjacent one of said chambers, said housing further having first and second sumps forming a bottom of said housing, said first sump being in fluid communication with said first chamber and said second sump being in direct fluid communication with said second and third chambers, each of said first and second sumps containing an aqueous reagent solution for the treatment of the gas stream flowing through said system;

means for delivering an aqueous reagent solution, to said first chamber to thereby treat the gas stream flowing through said housing, wherein one portion of said aqueous reagent solution reacts chemically with unwanted constituents in the gas stream to produce reaction products removing unwanted constituents from the gas stream and another portion of said aqueous reagent solution remains unreacted, and wherein the reaction products and the unreacted aqueous reagent solution are collected in said first and second sumps by being returned thereto from said first, second and third chambers;

means located external to said housing for delivering reagent to said first and second chambers to augment the aqueous reagent solution being delivered by said delivering means; and means fluid coupling said first and second sumps for delivering unreacted aqueous reagent solution from one of said first and second sumps to another one of said first and second sumps for combining with the unreacted aqueous reagent solution whereby the combined unreacted aqueous reagent solution is recycled, by said means for delivering, to said first chamber, to remove unwanted constituents from the gas stream flowing through said system.

11. The system according to claim 10, including demister means, disposed in the outlet of said downstream end of said housing, for removing moisture from said gas stream.

12. The system according to claim 10, wherein said means for delivering an aqueous reagent solution includes atomizing nozzle means.

13. The system according to claim 10, wherein said means for delivering an aqueous reagent solution includes first nozzle means for spraying solution into the gas stream flowing through said first chamber, second nozzle means for spraying solution into the gas stream flowing through said second chamber and third nozzle means for spraying solution into the gas stream flowing through said third chamber.

14. The system according to claim 10, wherein said aqueous reagent solution includes sodium hydroxide.

15. The system according to claim 10, wherein said aqueous reagent solution includes sodium hypoclorite.

16. The system according to claim 10, wherein said aqueous reagent solution is a compound selected from the group consisting of sodium hydroxide, sodium hypoclorite, sulfuric acid and hydrogen peroxide.

17. The system according to claim 10, including fan means for flowing said gas stream, under pressure, through said housing.

18. The system according to claim 10, including demister means disposed adjacent the downstream end of said first chamber.

19. A system for removing unwanted constituents from a gas stream, comprising:

an unitary housing, said housing having a top wall and a bottom wall, said housing further having, at an upstream end thereof, an inlet for receiving a gas stream carrying unwanted constituents, and having, at a downstream end thereof, an outlet for the exhaustion to atmosphere of a gas stream which has been cleaned while passing through said housing, said housing further having a partial wall disposed inside thereof, said wall forming a first chamber and a second chamber, said chambers being disposed between said upstream end and said downstream end, said chambers being in series fluid communication for confining a gas stream for treatment and for passing the gas stream from the inlet of said upstream end toward said downstream end and out the outlet thereof, wherein as said gas stream flows from said first chamber into said second chamber the direction of gas flow changes whereby said direction of flow in one of said chambers is opposite to the direction of flow in the other one of said chambers, said housing further having a first sump and a second sump, said sumps forming a bottom of said housing, said first sump being in fluid communication with said first chamber and said second sump being in fluid communication with said second chamber wherein said first sump contains a first reagent, said first reagent having a pH less than pH7, and said second sump contains a second reagent, said second reagent having a pH greater than pH7;

a wall interposed between said first sump and said second sump to prevent fluid flow therebetween;

means located external to said housing for delivering reagent to said first and second chambers to augment the aqueous reagent solution being delivered by said delivering means; and;

a first means for delivering said first reagent from said first sump to said first chamber and a second means for delivering said second reagent from said second sump to said second chamber wherein one portion of said first reagent reacts chemically with unwanted constituents in the gas stream flowing through said first chamber to produce reaction products removing unwanted constituents from the gas stream and another portion of said first reagent remains unreacted, and wherein the reaction products and the unreacted first reagent portion are collected in said first sump by being returned thereto from said first chamber, and wherein one portion of said second reagent reacts chemically with unwanted constituents in the gas stream flowing through said second chamber to produce reaction products removing unwanted constituents from the gas stream and another portion of said second reagent remains unreacted, and wherein the reaction products and the unreacted reagent portion are collected in said second sump by being returned thereto from said second chamber.

20. The apparatus according to claim 19, including demister means, disposed in the outlet of said downstream end of said housing, for removing moisture from said gas stream.

21. The apparatus according to claim 19, wherein said means for delivering an aqueous reagent solution includes atomizing nozzle means.

22. The apparatus according to claim 19, wherein said aqueous reagent solution includes sodium hydroxide.

23. The apparatus according to claim 19, wherein said aqueous reagent solution includes sodium hypoclorite.

24. The apparatus according to claim 19, wherein said first reagent is sulfuric acid and said second reagent is a compound selected from the group consisting of sodium hydroxide, sodium hypoclorite and hydrogen peroxide.

25. The apparatus according to claim 19, including fan means for flowing said gas stream, under pressure, through said vessel.

26. A system according to claim 19, including mist eliminator means, said means being disposed between said first chamber and said second chamber.

27. A method of cleaning a gas stream by removing therefrom unwanted odorous substances, in a single pass through a treatment system utilizing highly reactive reagents and less reactive reagents simultaneously, the method comprising the steps of:

providing an housing having a first treatment chamber for confining the gas stream for pretreatment, said chamber including a packed bed and a sump;

providing a second treatment chamber within said housing in fluid communication with said first treatment chamber, for confining the gas stream for further treatment, said second treatment chamber also including a packed bed and a sump;

selecting a first aqueous reagent solution, said solution containing a reagent selected from the class consisting of sodium hydroxide, sodium hypochlorite, sulfuric acid and hydrogen peroxide;

wetting the packed bed in the first chamber with a surplusage of the selected first aqueous solution, said solution containing a chemical reagent reactive to the gas stream odorous substances for chemical reaction therewith for formation of reaction products;

providing a wall between said sumps to prevent fluid flow therebetween;

selecting a second aqueous reagent solution, said second solution being other than the first selected solution, said solution containing a reagent selected from the class consisting of sodium hydroxide, sodium hypochlorite, sulfuric acid and hydrogen peroxide;

wetting the packed bed in the second chamber with a surplusage of the selected second aqueous solution, said solution containing a chemical reagent reactive to the gas stream odorous substances for chemical reaction therewith for formation of reaction products;

passing sequentially the gas stream through the first and second chambers including passing the gas stream through the respective packed beds;

collecting in the first and second sumps, respectively, the reaction products formed in the respective packed beds and the portion of the aqueous solution unreacted with odorous substances;

discharging reaction products from said first and second sumps;

and discharging a cleaned gas stream from said housing.

28. A method according to claim 27, including providing mist eliminator means between said first chamber and said second chamber.

29. A method according to claim 27 including wetting one of the packed beds with an aqueous solution having a pH less than 7 and wetting the other packed bed with an aqueous solution having a pH greater than 7.

30. A method according to claim 27 including wetting the first chamber packed bed with an acidic aqueous solution and wetting the second chamber packed bed with a basic solution.

* * * * *

(12) EX PARTE REEXAMINATION CERTIFICATE (7313th)

United States Patent
Jain et al.

(10) Number: US 6,174,498 C1
(45) Certificate Issued: Jan. 12, 2010

(54) ODOR CONTROL SYSTEM

(75) Inventors: Roop C. Jain, San Diego, CA (US); Martin Scanlan, La Jolla, CA (US)

(73) Assignee: United States Filter Corporation, Palm Desert, CA (US)

Reexamination Request:
No. 90/007,022, Apr. 30, 2004

Reexamination Certificate for:
Patent No.: 6,174,498
Issued: Jan. 16, 2001
Appl. No.: 08/827,848
Filed: Apr. 11, 1997

Related U.S. Application Data

(63) Continuation of application No. 08/427,128, filed on Apr. 24, 1995, now abandoned, which is a continuation-in-part of application No. 08/232,203, filed as application No. PCT/US92/09248 on Oct. 27, 1992, now Pat. No. 5,518,696, which is a continuation of application No. 07/783,178, filed on Oct. 28, 1991, now abandoned.

(51) Int. Cl.
| B01D 53/52 | (2006.01) |
| B01D 53/48 | (2006.01) |
| B01D 53/73 | (2006.01) |
| B01D 53/54 | (2006.01) |
| B01D 53/58 | (2006.01) |
| B01D 53/68 | (2006.01) |
| B01D 53/50 | (2006.01) |

(52) U.S. Cl. .............................. 422/122; 261/DIG. 72; 422/123; 422/171; 422/173; 95/187; 95/211; 95/235; 96/290

(58) Field of Classification Search ................... None
See application file for complete search history.

(56) References Cited

U.S. PATENT DOCUMENTS

| 973,120 A | 10/1910 | Lloyd |
| 1,657,822 A | 1/1928 | Frechou |
| 1,790,975 A | 2/1931 | Dallas et al. |
| 1,993,175 A | 3/1935 | Libbey et al. |
| 2,585,440 A | 2/1952 | Collins |
| 2,603,354 A | 7/1952 | Way et al. |
| 2,716,489 A | 8/1955 | Way |

(Continued)

FOREIGN PATENT DOCUMENTS

NL 25116 4/1931

OTHER PUBLICATIONS

Duall Industries, Inc. Technical Bulletins 191–2 (4/88), 191–5 (2/88), 191–3 (4/88), Duall Industries, Inc., Owosso, Michigan.

(Continued)

*Primary Examiner*—Elizabeth L McKane

(57) ABSTRACT

An odor control system and method for removing unwanted odorous airborne constituents in which the gas stream is flowed through a compact, boxlike housing having a plurality of sequentially communicating treatment chambers. Gas stream pretreatment is accomplished in a first chamber, in fluid communication with a sump, as the gas flows through a packed bed wetted by suitable chemical reagents. After pretreatment, the gas stream is passed through downstream chambers, also utilizing wetted packed beds. These chambers are in fluid communication with a second, separate sump. Because of the first chamber/separate sump combination, influent gas treatment, by stages, can be accomplished. In this manner, different, contemporaneous chemical treatment are possible, within the single housing, with different chemical reagents utilized as needed. Such treatments are possible even in cases where otherwise incompatible chemical reagents are used. Reagents used in the first chamber are, in substantial part, recycled from the blowdown of the first chamber sump which can be augmented, if desired, by unreacted chemicals in the blowdown of the downstream sump. After treatment in the last downstream chamber, the cleaned gas flows through a demister, for moisture removal, before it is exhausted to atmosphere.

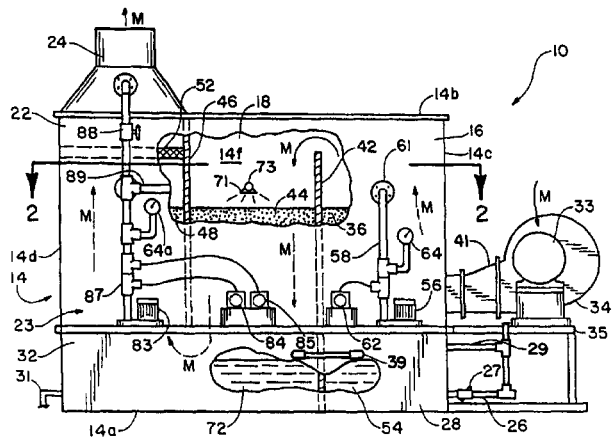

U.S. PATENT DOCUMENTS

| | | | |
|---|---|---|---|
| 2,879,893 A | 3/1959 | Stebbins |
| 3,122,594 A | 2/1964 | Kielback |
| 3,282,432 A | 11/1966 | Greenleaf, Jr. |
| 3,312,348 A | 4/1967 | Greenleaf, Jr. |
| 3,768,234 A | 10/1973 | Hardison |
| 3,907,523 A | 9/1975 | Melin, Jr. |
| 3,936,281 A | 2/1976 | Kurmeier |
| 4,039,307 A | 8/1977 | Bondor |
| 4,157,962 A | 6/1979 | Huang et al. |
| 4,251,486 A | 2/1981 | Sohda |
| 4,588,535 A | 5/1986 | Foidl |
| 4,642,188 A | 2/1987 | DeVisser et al. |
| 4,734,108 A | 3/1988 | Cox et al. |
| RE35,234 E | 5/1996 | Davis |

OTHER PUBLICATIONS

Duall Air—Stripping Columns Brochure, 1986, Duall Industries, Inc.

Tri-Mer® Corporation Air Pollution Control Systems Product Catalog, 1988, Tri–Mer® Corporation, Owosso, Michigan.

"The Ad–Ox: A High Rate Wastewater Odor Polishing Scrubber—Purafil," Bulletin, 1988, Purafil, Inc. Environmental Systems Division, Oconomowoc, Wisconsin.

G.J. Nagl, "Economics of Odor Control," ARI Technologies, Inc., Palatine, Illinois, For Presentation at the WPCF Annual Conference, Dallas, Texas, Oct. 2–6, 1988.

L. Mansfield et al., "Selection and Full–Scale Use of a Chelated Iron Absorbent for Odor Control," pp. 1–19, Department of Public Works, Honolulu, Hawaii.

ARI Technologies presents the new LO–CAT™ hydrogen sulfide oxidation process Brochure, ARI Technologies, Inc., Palatine, Illinois.

"LO–CAT® The Cat That Devours $H_2S$" Brochure, ARI Technologies, Inc., Palatine, Illinois.

"Hydro–Vac® Wastewater Conditioner" Brochure, pp. 1–16, Hydro–Vac®, Kerrville, Texas.

"Water Champ" Submersible Chlorine Induction System Brochure, Sep. 1988, Gardiner Equipment Company, Inc., Houston, Texas.

"Water Champ Chlorine Induction Unit" Brochure, Sep. 1988, Gardiner Equipment Company, Inc., Houston, Texas.

Heat Systems, High Energy Advanced Technology Environmental Profile, Heat Systems Incorporated, Farmingdale, NY.

"$H_2S$ Problem Solved in Honolulu," *Water Environment & Technology*, Jan. 1993, pp. 13–16.

Pepcon Systems, Inc. OdorMaster and ChlorMaster Electrolytic Systems Brochure, 1989, Pepcon Systems, Inc., Henderson, NV.

Interel Corporation Environmental Control Systems, Chem Show Special Scrubber Offers Memo and Brochures, 1983, Interel Corporation, Engelwood, CO.

Quad Environmental Technologies Corporation, Letter of Transmittal and Proposal No. 1225, Jun. 6, 1988, Quad Environmental Technologies Corporation, Northbrook, IL.

Triplex™ Scrubber Model Operation and Maintenance Manual For Eleventh Street Pump Station, Houston, TX (Davis Process Poly Stage Air Scrubber Systems, Davis Water & Waste Industries, Inc., Tallevast, FL) ("Triplex Manual")—available prior to Apr. 11, 1997.

"Davis Poly Stage Air Scrubber System," Process Division Technical Bulletin No. A–201, Process Division, Davis Water & Waste Industries, Inc., Tallevast, Florida.

"Pepcon OdorMaster Odor Control System," Pepcon Systems Inc., Las Vegas, NV, Advertisement published in *Pollution Engineering*, Mar. 15, 1992, p. 48.

"Quad Chemtact™ Systems For Efficient Sewage Odor Control," Brochure, Quad Environmental Technologies Corporation, Northbrook, IL.

"Water and Wastewater Systems," Bulletin HM 100, Harrington Industrial Plastics, Inc. Environmental Engineering, San Bernardino, California.

"Horizontal/Vertical FRP Fume Scrubbers," Bulletin HPS 600, Harrington Industrial Plastics, Inc., Anaheim, California.

V. Frega (The Ceilcote Company, Berea, OH), "Industrial Odor Control," Chapter 42, *Air Pollution Control and Design Handbook—Part 2*, pp. 977–1003, 1977.

Industrial Odor Control Manual, Ceilcote Air Pollution Control, A Division of Master Builders, Inc., Berea, OH.

P. Cheremisinoff, *Air Pollution Control and Design for Industry*, Chapter 9 (pp. 276–277) and Chapter 15 (pp. 476–479), Marcel Dekker, Inc., New York, NY.

B. McIlvaine, "New Treatment Schemes Control Odors," *Water/Engineering & Management Magazine*, Jan. 1990.

"Packed Wet Scrubbers Solve Odor Abatement Problems," *Ceilcote—The Corrosion Consultant*, Feb. 1973, vol. VIII, No. 1, The Ceilcote Company, Berea, Ohio.

"Tri–Mer VTB Packed Bed Tower Series" Brochure, 1984, Tri–Mer Corporation, Owosso, Michigan.

"Odor Control Systems—100% Corrosion Free" Brochure, Duall Industries, Inc.

J. Librizzi et al., "Controlling Air Pollution from Semiconductor Fabrication Operations," *Microelectronic Manufacturing and Testing*, Dec. 1983, Lake Publishing Corp., Libertyville, IL.

Ceilcote Bulletin 1201, 1981, pp. 2–3, 12–13, The Ceilcote Company.

J. Newton, "Controlling Toxic Chemicals in the Air," *Pollution Engineering*, Aug. 1991, pp. 82–86.

G. Van Durme et al., "Removal of Reactive Organic Gases with a Packed Tower Chemical Scrubber," Apr. 1992, Los Angeles, California.

"Mobile Scrubbing and Evacuation Unit For: Manhole Evacuation and Temporary Odor Control Problems," Operations, Use, Installation and Maintenance Manual, Vapex Systems, Inc.

"Specialists in Air and Gas Purification" Brochure, Unisorb Corp. (A Division of Contamination Control, Inc.), South Houston, Texas.

"New Horizons in Odor Control," Brochure, 1987, Duall Industries, Inc., Owosso, Michigan.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–30 are cancelled.

\* \* \* \* \*